United States Patent Office 2,958,648
Patented Nov. 1, 1960

2,958,648

CONVERSION OF HYDROCARBONS WITH A SYNTHETIC SILICA-ALUMINA-MAGNESIA CATALYST COMPOSITE

David G. Braithwaite, Chicago, Ill., assignor to Nalco Chemical Company, a corporation of Delaware No Drawing. Filed Nov. 27, 1956, Ser. No. 624,495

10 Claims. (Cl. 208—120)

This invention relates to new chemical compositions containing silica, alumina and magnesia, and more particularly to silica-alumina-magnesia catalysts, and to a new and improved process for the preparation thereof. The invention further relates to the conversion of hydrocarbon oils and especially the cracking of petroleum hydrocarbons utilizing a catalyst of the type herein described to obtain new and improved results.

Silica-magnesia catalysts are well known and have certain desirable characteristics. However, most catalysts when used for cracking hydrocarbon oils become deactivated due to the formation of carbon on the catalyst. It is then necessary to regenerate the deactivated catalyst by burning off the carbon. The major obstacle for the commercial application of the silica-magnesia catalyst has been the fact that the carbon could not adequately be removed during the regeneration cycle. Another disadvantage of the use of silica-magnesia catalysts has been the relatively low volatility and relatively low octane number of the gasoline produced by cracking petroleum oils in the presence of such catalysts.

One of the objects of the present invention is to provide a new and improved highly porous silica-alumina-magnesia composition which is particularly well suited for use as a catalyst and especially in the cracking of petroleum hydrocarbons.

Another object of the invention is to provide a catalyst of the type described which produces a higher yield of gasoline than a silica-alumina catalyst when employed in a conventional cracking process but at the same time is not subject to the disadvantages of the silica-magnesia catalyst.

A further object of the invention is to provide a new and improved process for producing silica-alumina-magnesia compositions of the type previously described.

An additional object of the invention is to provide a new and improved process for converting petroleum hydrocarbons and more particularly a new and improved cracking process. Other objects will appear hereinafter.

In accomplishing these objects in accordance with the invention it has been found that a silica-alumina-magnesia composition having excellent catalytic properties, especially for the cracking of petroleum hydrocarbons, can be obtained by reacting magnesium oxide, or a compound capable of being converted to magnesium oxide, in an aqueous medium with a dried silica-alumina gel. The proportions of silica ($SiO_2$), alumina ($Al_2O_3$) and magnesia ($MgO$) should be such that the silica content of the resultant catalyst is within the range of 55% to 85% by weight, preferably 70% to 85% by weight, the alumina content is within the range of 5% to 40% by weight, preferably about 10% to about 25% by weight, and the magnesia content is within the range of 4% to 30% by weight, preferably 15% to 30% by weight.

The silica-alumina-magnesia compositions should have a pore volume of 0.5 to 1.0 cubic centimeters per gram (cc./g.), preferably 0.6 to 0.9 cc./g., and an average pore diameter of 40 to 100 angstrom units (A.), preferably 50 to 75 A. The silica-alumina-magnesia compositions are preferably prepared in the form of microspherical particles having a surface area of 400 to 550 square meters per gram (m.²/g.), preferably 450 to 550 m.²/g.

Examples of specific silica-alumina-magnesia compositions falling within the scope of the invention are the following:

TABLE I

| Composition | Percent by Weight $SiO_2$ | Percent by Weight $Al_2O_3$ | Percent by Weight $MgO$ |
|---|---|---|---|
| A | 71 | 11 | 18 |
| B | 82 | 13.5 | 4.5 |
| C | 80.2 | 12.3 | 7.5 |
| D | 76.3 | 12.3 | 11.4 |

Composition A, for instance, when prepared in the form of microspherical particles as hereinafter described, has a surface area of 450 m.²/g., a pore volume of about .69 cc./g. and an average pore diameter of about 54 A.

In the preferred practice of the process for preparing compositions of the type herein described a porous silica-alumina base having a pore volume of at least 0.5 cc./g. is first prepared. This base will contain 55% to 95% by weight of silica and 5% to 45% by weight of alumina on a dry basis without taking into consideration the water present in the gel structure of the silica and alumina. The silica-alumina base is dried sufficiently to set the gel structure and the pore size of the catalyst mass prior to incorporation of the magnesia. This is preferably accomplished by spray drying a silica-alumina hydrogel having the composition and physical characteristics previously described to form microspherical particles which contain less than about 30% free moisture, preferably approximately 25% free moisture. The dried silica-alumina hydrogel having the aforementioned pore volume is then preferably washed to remove soluble impurities and then reacted with magnesium oxide. When the preparation is carried out in this manner the pore volume and pore diameter retain essentially the structure established by the precursor base.

The reaction with magnesium oxide involves reslurrying of the dried silica-alumina in water, then heating to reaction temperature of at least 125° F., preferably 150° F. to 180° F. (but not necessarily limited to this range) and adding magnesium oxide either as a powder or as an aqueous slurry. The entire mass is then held at this reaction temperature for a period of time sufficiently long for the reaction to take place and during this reaction step agitation is employed to obtain intimate contact between the magnesium oxide and the silica-alumina precursor base. The period of time required is subject to variation but will usually be within the range of about 1 to about 3 hours and good results have been obtained by carrying out the reaction between the precursor base and the magnesium oxide at temperatures in excess of 150° F. but below the boiling point of water for a period of about 2 hours. Following the reaction with the magnesium oxide, the resultant slurry is dewatered, washed superficially to remove unreacted or excessive magnesium oxide and then dried at a relatively low temperature, for example, by a flash drying process in which the actual material temperature does not exceed about 250° F. The dried product contains about 10% to 15% free water (that is, without taking into consideration the water which is chemically combined in the hydrogel). No calcining at elevated temperatures is required.

In preparing a silica-alumina precursor base having a pore volume of at least 0.5 cc./g. and an average pore diameter of at least 40 A. as required for the purpose of this invention the method preferably employed involves the preparation of the precursor base in the form of clear glass-like silica-alumina hydrogel compositions by precipitating silica in hydrous form by adding to an aqueous alkali silicate solution a quantity of a mineral acid sufficient to precipitate the silica in hydrous form while retaining the pH above about 5, adding to the resultant slurry an aqueous solution of a soluble acidic aluminum salt containing the aluminum in the cation portion (e.g., aluminum sulfate or aluminum chloride), adding to the resultant slurry an aqueous solution of a soluble alkaline aluminum salt containing aluminum in the anion portion and recovering the resultant solid product in any suitable manner, preferably by spray drying.

When a silica-alumina hydrogel is precipitated by the foregoing process, or in some other manner, the concentrations and temperatures used have an important bearing on the pore volume and average diameter of the pores in the resultant hydrogel. In general, it is desirable for the purpose of the invention to have a high concentration of solids present in order to secure a pore volume greater than 0.5 cc./g. and an average pore diameter greater than 40 A. The optimum concentration of $SiO_2$ and $Al_2O_3$ in the solution from which the hydrogel is formed is preferably around 6% solids. If a much greater concentration is used the solution becomes too heavy for practical handling and for spray drying to produce microspherical particles.

The temperature is also a factor in determining the pore volume because higher temperatures produce a greater pore volume in the resultant hydrogel. The concentration of $SiO_2$ and $Al_2O_3$ can be reduced somewhat provided higher temperatures are used. Thus, it is possible to operate with a minimum concentration of around 1% $SiO_2$ and .15% $Al_2O_3$ in the solution from which the silica-alumina hydrogel is precipitated provided the temperatures are high enough to produce the desired minimum pore volume and average pore diameter. For this purpose the temperature should preferably be within the range of 80° F. to 180° F.

In the foregoing process for preparing the silica-alumina the source of the silica employed can be commercial water glass or any other alkaline aqueous solution of sodium silicate or potassium silicate. The silicate employed is preferably an orthosilicate but can also be a metasilicate. A typical sodium silicate solution suitable for the practice of the invention consists essentially of 28% $SiO_2$ and 9.1% $Na_2O$, the remainder being water.

The acid which is added to the aqueous alkaline solution to precipitate the silica can be any dilute acid but is preferably a dilute mineral acid, for example, sulfuric acid or hydrochloric acid. The concentration, temperature and rate of acid addition can be varied in order to vary the pore volume, the pore diameter and the surface characteristics of the finished catalysts. When the acid employed is an aqueous solution of sulfuric acid, it is preferable to use a concentration of around 25% to 35% $H_2SO_4$. Higher concentrations can be used but concentrations which are too high should be avoided to avoid the generation of heat and localized action. With the higher concentrations of acid it is desirable to maintain adequate agitation and this is true even where the acid concentration of sulfuric acid is around 35%.

The relative concentration of $SiO_2$ in the slurry during the acid addition is comparatively low, say around 1% to 10% by weight, and the reaction which occurs is not violent because of the relatively large quantities of water present. Nevertheless, the generation of heat and localized action are to be avoided by using the precautions previously indicated.

The quantity of the aqueous acid solution added to the alkaline aqueous silicate solution is sufficient to precipitate silica in hydrous form and to lower the pH of the resultant solution, preferably until the solution is still mildly alkaline (e.g., around pH 8 to 10.5), although the pH can be reduced to as low as about 5 in this step.

An acidic aqueous solution of an aluminum salt in which aluminum is present in the cation only (e.g., aluminum sulfate or aluminum chloride, preferably the former), is added to the slurry obtained from the preceding step to further lower the pH of the resultant slurry, preferably to around pH 2 or below, and to precipitate alumina in hydrous form.

An aqueous solution of an aluminum salt in which the aluminum exists in the anion (e.g., sodium aluminate or calcium aluminate) is added to the slurry obtained from the preceding step to partially neutralize the acidity produced by the addition of the acid solution of aluminum salt, preferably to a pH of around 5 to 5.5, simultaneously impregnating the silica gel with alumina precipitated from both sources.

The dilution of the aqueous solution of aluminum salt in the preceding step is preferably such that the weight ratio of water to said salt, expressed as $Na_2Al_2O_4$, is at least 7.5:1 and preferably about 15:1, or more. The volume dilution of a sodium aluminate solution is usually at least 5:1 and preferably around 10:1.

The slurry obtained after the preceding step is preferably filtered to increase the total solids concentration to in excess of 8% by weight of the composition. This filtration step is optional but is particularly important where it is desired to produce microspheres having a particle size within the range of 20 microns to 100 microns, which is a desirable particle size for fluidized catalysts. The filtering step also effects a substantial purification by the removal of dissolved salts and enhances the formation of a continuous phase in the microspherical particles that are subsequently formed. If the slurry is filtered and it is desired to spray dry the filter cake, the latter should be reslurried with enough water to produce a pumpable mixture.

The temperature of the silica-alumina reaction mixture is subject to variation but is preferably within the range of 40° F. to 140° F. in each of the various stages of the reaction. In general, the temperature of the reaction mixture during the precipitation of the silica and the alumina should be above the freezing temperature and below the boiling point of water.

If the precipitation has been effected at a low temperature, and it is desired to filter the resultant slurry before drying, it has been found that heating the slurry to a temperature within the range of 100° F. to 190° F., preferably about 110° F. to 150° F. is an aid to filtration.

The slurry containing the silica and alumina in hydrous form, for example, as a hydrous gel, is preferably dried in such a manner as to form microspherical particles. This is preferably accomplished by spray drying. The spray drying air temperature is ordinarily within the range of 200° F. to 1000° F. The temperature used will depend on such factors as the quantity of material to be dried and the quantity of air used in the drying.

The evaporation rate will vary depending upon the quantity of air used in the drying. The temperature of the particles which are being dried is preferably within the range of 150°–300° F. at the completion of the drying.

The drying is preferably effected by a process in which the silica-alumina particles to be dried and a hot air stream are moving in the same direction for the entire drying period. This is usually referred to as concurrent drying as distinguished from countercurrent drying of the type carried out in a cyclone apparatus. Concurrent drying has the advantage for the purpose of the present invention that it gives large particles an opportunity to dry before they can adhere to the walls of the drier or to other particles.

The spray dried silica-alumina microspherical particles are preferably treated to remove sodium salts and the sulfate ion before reacting them with magnesium oxide. This is preferably accomplished by reslurrying the particles with water and filtering them to remove water soluble salts so that the sodium salts, expressed as $Na_2O$, are less than 0.02% by weight, and the sulfate salts, expressed as $SO_4$, are less than 0.5% by weight.

The resultant silica-alumina hydrogel material is then reacted with the magnesium oxide in the manner previously described. Instead of using magnesium oxide, magnesium hydroxide can be employed or other magnesium salts can be used which will decompose to yield magnesia. The use of such other salts is undesirable because their use involves the addition of a precipitant or thermal decomposition in some cases, followed by more elaborate washing, all of which tends to increase the manufacturing costs of the catalysts. Thus, the magnesia can be incorporated with the silica-alumina precursor base in the form of magnesium formate, acetate or nitrate which can then be thermally decomposed to produce the magnesia. Alternatively, magnesium sulfate or magnesium chloride can be reacted with ammonium hydroxide or another basic material to precipitate magnesium hydroxide from which contaminating ions are removed by washing and the oxide is formed by heat treatment.

The invention will be further illustrated but is not limited by the following examples in which the quantities are stated in parts by weight unless otherwise indicated.

Example I

To 6200 gallons of water and 1250 gallons of sodium silicate (28.8% $SiO_2$, 9.1% $Na_2O$) at a temperature of 82° F. was added with agitation 442 gallons of 35% sulfuric acid over a 35 minute period.

To the resultant precipitated silicic acid gel was added 375 gallons of a 25% aqueous solution of aluminum sulfate and the resultant mixture was thoroughly agitated. Next there was added 105 gallons of an aqueous solution of 42% sodium aluminate ($Na_2Al_2O_4$) containing 4.5% excess sodium hydroxide (NaOH). The sodium aluminate was diluted with 10 volumes of water for each volume of sodium aluminate solution prior to addition to the batch.

In this process the addition of the sulfuric acid to the alkaline sodium silicate lowers the pH but the resultant mixture is still on the alkaline side. The addition of the aluminum sulfate causes the precipitation of alumina and at the same time reduces the pH to the acid side around pH 2 or below. The subsequent addition of the sodium aluminate adjusts the pH by raising it to around 5.3, simultaneously impregnating the silica gel with alumina precipitated both from the aluminum sulfate and the sodium aluminate.

The resultant slurry was filtered on a vacuum rotary filter. The filter cake was then reslurried with water to a pumpable mixture and spray dried by concurrent drying in the manner previously described herein.

An aqueous suspension of the spray dried material was prepared and filtered on washing filters to remove soluble salts to limits as follows:

Sodium salts, expressed as $Na_2O$ ____ Less than 0.02% by weight.
Sulfate salts, expressed as $SO_4$ _____ Less than 0.5% by weight.

The washed silica-alumina was slurried in 1640 gallons of water and the slurry was heated to a temperature within the range of 150° F. to 180° F. 985 gallons of an aqueous slurry containing 19.3% by weight of magnesium oxide was then added to the heated slurry of silica and alumina in water and the entire mass was held at a temperature of about 180° F. for 2 hours. During this time agitation was employed to maintain intimate contact between the magnesium oxide and the silica-alumina. The resultant slurry was dewatered by filtering, washed superficially with water to remove unreacted or excess magnesium oxide and then dried by flash drying under conditions such that the particle temperature did not exceed 230° F.

The resultant catalyst contains approximately 70% $SiO_2$, 11% $Al_2O_3$ and 19% MgO. It has a surface area of about 450 $m^2/g$., a pore volume of about .61 cc./g. and an average pore diameter of about 54 A.

Example II

To 5820 gallons of water and 1175 gallons of sodium silicate (28.6% $SiO_2$) at a temperature of 86° F. was added with agitation 404 gallons of 35% sulfuric acid over a period of 60 minutes.

To the resultant precipitated silicic acid gel was added 765 gallons of an aqueous solution of aluminum sulfate (7.6% $Al_2O_3$) and the resultant mixture was thoroughly agitated. Next there was added 220 gallons of sodium aluminate (27% $Al_2O_3$) aqueous solution dissolved in 1760 gallons of water. The sodium aluminate solution was added over a period of 25 minutes and the final pH was around 5.0 to about 5.2. The silica-alumina precursor base was spray dried and purified as described in Example I. It was then reacted with magnesium oxide according to the general procedure described in Example I using sufficient proportions of magnesium oxide to produce a catalyst containing 59.9% silica, 19.9% alumina and 20.2% magnesia.

In a similar manner other catalysts containing varying proportions of silica, alumina and magnesia within the scope of the invention may be prepared.

The catalysts of the invention were evaluated in a fluidized fixed bed type of petroleum hydrocarbon cracking unit using a cracking temperature around 900° F. and a processing period of 15 minutes. In this procedure the feed stock was vaporized in a preheater and passed upwardly through a bed of essentially +200 mesh catalyst. The reactor was immersed in a sand-type heating bath maintained at 900° F. The reactor pressure was essentially atmospheric. 150 ml. of oil to be cracked was charged into the reaction over the 15 minute process period and the quantity of catalyst charged to the unit was varied to obtain a desired space velocity and the desired conversion level.

In one series of tests a catalyst corresponding to Composition A prepared in the manner previously described was compared with a silica-alumina precursor base containing 87% $SiO_2$, 13% $Al_2O_3$. Prior to use the catalysts were treated by a conventional steaming procedure wherein water was allowed to drip on the catalysts and heat applied separately while maintaining a steam pressure of 40 pounds per square inch gauge at a temperature of 1200° F. for 10 hours.

The results are shown in the following table at various volume-percent conversion.

TABLE II

| | $H_2$ (Ft.³/Bl.) | $C_3$ and Lighter Dry Gas | | $C_4$, Percent by Vol. | Gasoline, Percent by Vol. | Carbon, Percent by Wt. |
|---|---|---|---|---|---|---|
| | | Ft.³/Bl. | Percent by Wt. | | | |
| I. Silica-Alumina Precursor Base Vol. & Conv.: | | | | | | |
| 47.5 | 21.2 | 228 | 6.3 | 12.3 | 33.6 | 3.8 |
| 56.1 | 26.0 | 293 | 8.0 | 15.8 | 37.3 | 5.4 |
| 56.6 | 25.9 | 290 | 8.1 | 15.9 | 37.5 | 5.6 |
| 69.0 | 27.9 | 313 | 8.7 | 17.0 | 37.8 | 6.1 |
| 64.2 | 32.1 | 363 | 10.0 | 19.9 | 38.0 | 7.5 |
| II. Silica-Alumina-Magnesia Catalyst Composition A: | | | | | | |
| 47.5 | 17.4 | 216 | 5.6 | 10.2 | 35.0 | 3.5 |
| 56.1 | 21.9 | 261 | 7.2 | 13.3 | 39.6 | 5.1 |
| 56.9 | 16.3 | 244 | 6.9 | 13.7 | 40.5 | 4.6 |
| 59.0 | 21.2 | 285 | 7.6 | 13.6 | 42.0 | 5.6 |
| 64.2 | 27.6 | 345 | 9.2 | 16.5 | 41.5 | 6.8 |

These results show that the silica-alumina-magnesia catalyst as compared with the silica-alumina catalyst showed greater gasoline production, less carbon formation, a greater utilization of hydrogen, $C_3$ hydrocarbons, $C_4$ hydrocarbons and lighter hydrocarbons and hence a much greater overall efficiency. For example, in comparing the gasoline production from the silica-alumina base and that from the silica-alumina-magnesia base at a volume percent conversion of 59, the gasoline production from the latter was over 4% greater. When considering the great volumes of gasoline refined even a 1% to 2% increase in production is relatively enormous.

The catalysts of the invention can be employed for the conversion of petroleum hydrocarbons in various types of catalytic units including the fixed bed and the fluidized units. Not only are the catalysts useful for cracking petroleum oils such as heavy naphthas, gas oils and the like at temperatures in the range of around 800° F. to 975° F. and pressures from atmospheric up to about 5 atmospheres but they can also be employed in reforming and hydroforming wherein gasolines are heated at temperatures around 900° F. to 1050° F. at pressures of 5 to 25 atmospheres absolute and liquid space velocities between about 0.1 and 2 per hour. In such processes the treatment of the petroleum hydrocarbon liquid takes place in the presence of hydrogen. In hydroforming processes hydrogen is added but there is no substantial utilization of hydrogen.

The invention results in a different type of catalyst and a different type of hydrocarbon conversion from that obtained with the conventional silica-magnesia catalyst. For example, a typical silica-magnesia catalyst might be prepared by adding sulfuric acid to a sodium silicate solution until the pH is around 5.0 to form a hydrogel. This hydrogel, if dried, would normally, depending upon the temperature and concentration during gelation, yield a silica gel having a pore volumn in the range of 0.6 to 0.8 cc./g. and an average pore size of approximately 40 to 70 A. However, when 30% magnesium oxide is added and reacted for 2 hours at 150° F. the resultant silica-magnesia catalyst has the following properties.

Surface area _____ m.²/g__ 507
Pore volume _____ cc./g__ .29
Average pore diameter _____ A__ 23
Apparent bulk density _____ g./cc__ .95

This catalyst is crystalline and shows a well defined crystalline X-ray pattern. On the other hand, the silica-alumina-magnesia catalysts prepared in accordance with the invention give a much weaker X-ray pattern indicating that the catalysts are predominantly amorphous. The catalysts of the present invention also have much larger pore volumes and average diameters.

The present application is a continuation-in-part of my copending application Serial No. 435,070, filed June 7, 1954, and the disclosure of said application is hereby incorporated in the present application as fully as if it had been set forth in its entirety.

The invention is hereby claimed as follows:

1. A silica-alumina-magnesia catalyst for converting hydrocarbon oils consisting essentially of 55% to 85% by weight $SiO_2$, 5% to 40% by weight $Al_2O_3$ and 4% to 30% by weight MgO, said catalyst having a pore volume of 0.5 to 1 cc./g., an average pore diameter of 40 to 100 A., and a surface area of 400 to 550 m.²/g.

2. A silica-alumina-magnesia catalyst for converting hydrocarbon oils consisting essentially of 70% to 85% by weight $SiO_2$, 10% to 25% by weight $Al_2O_3$ and 15% to 30% by weight MgO, said catalyst having a pore volume of 0.6 to 0.9 cc./g., an average pore diameter of 50 to 75 A., and a surface area of 450 to 550 m.²/g.

3. A process of preparing a silica-alumina-magnesia catalyst which comprises preparing a precursor silica-alumina hydrogel base containing 55% to 95% by weight of silica and 5% to 45% by weight of alumina on a dry basis excluding any water present in the gel structure of the silica and alumina, said gel structure having a pore volume of at least 0.5 cc./g. and an average diameter of at least 40 A., drying said silica-alumina hydrogel sufficiently to set the gel structure and the pore size, incorporating magnesia with the resultant silica-alumina hydrogel in sufficient amount to produce a final catalyst containing 4% to 30% magnesia, and drying the resultant silica-alumina-magnesia catalyst.

4. A process as claimed in claim 3 in which the silica-alumina precursor base is purified and contains less than 0.02% by weight of sodium salts, expressed as $Na_2O$, and less than 0.5% sulfate salts, expressed as $SO_4$.

5. A process as claimed in claim 3 in which the drying to set the gel structure is effected by spray drying a slurry of a silica-alumina hydrogel to form microspherical particles.

6. A process of converting hydrocarbons which comprises bringing a petroleum hydrocarbon oil into contact with a silica-alumina-magnesia catalyst consisting essentially of 55% to 85% by weight $SiO_2$, 5% to 40% by weight $Al_2O_3$ and 4% to 30% by weight MgO, said catalyst having a pore volume of 0.5 to 1 cc./g., an average pore diameter of 40 to 100 A., and a surface area of 400 to 550 m.²/g., under hydrocarbon conversion conditions.

7. A process of converting hydrocarbons which comprises bringing a petroleum hydrocarbon oil into contact with a silica-alumina-magnesia catalyst consisting essentially of 70% to 85% by weight $SiO_2$, 10% to 25% by weight $Al_2O_3$ and 15% to 30% by weight MgO, said catalyst having a pore volume of 0.6 to 0.9 cc./g., an average pore diameter of 50 to 75 A., and a surface area of 450 to 550 m.$^2$/g., under hydrocarbon conversion conditions.

8. A process as claimed in claim 6 in which the hydrocarbon conversion conditions are such as to effect cracking of the petroleum hydrocarbon oil.

9. A process as claimed in claim 6 in which the hydrocarbon conversion conditions are such as to effect reforming of the petroleum hydrocarbon oil.

10. A process as claimed in claim 6 in which the hydrocarbon conversion conditions are such as to effect hydroforming of the petroleum hydrocarbon oil.

References Cited in the file of this patent

UNITED STATES PATENTS

| | | |
|---|---|---|
| 2,484,258 | Webb et al. | Oct. 11, 1949 |
| 2,490,975 | Mathy | Dec. 13, 1949 |
| 2,551,014 | Kimberlin et al. | May 1, 1951 |
| 2,694,673 | Kimberlin et al. | Nov. 6, 1954 |
| 2,744,056 | Offutt et al. | May 1, 1956 |